United States Patent [19]
Sakuragi et al.

[11] 3,737,911
[45] June 5, 1973

[54] OBJECT IDENTIFICATION SYSTEM

[75] Inventors: Johji Sakuragi, Kunitachi-shi, Tokyo; Kazuhiko Kameda, Kawasaki-shi, both of Japan

[73] Assignee: Tokyo Shibaura Electric Co., Ltd., Kawasaki-shi, Japan

[22] Filed: Aug. 17, 1970

[21] Appl. No.: 64,585

Related U.S. Application Data

[63] Continuation of Ser. No. 794,854, Jan. 29, 1969, abandoned.

[30] Foreign Application Priority Data

Feb. 3, 1968 Japan .................................43/6464
Dec. 28, 1968 Japan .......................43/114288

[52] U.S. Cl..............................................343/6.5 SS
[51] Int. Cl.....................................................G01s 9/02
[58] Field of Search...............................343/6.5 SS

[56] References Cited

UNITED STATES PATENTS

| | | |
|---|---|---|
| 3,172,102 | 3/1965 | Chapman........................343/6.5 SS |
| 3,169,242 | 2/1965 | Davis et al.......................343/6.5 SS |
| 3,209,350 | 9/1965 | Davis et al.......................343/6.5 SS |
| 3,182,314 | 5/1965 | Kleist et al......................343/6.5 SS |
| 3,182,315 | 5/1965 | Sweeney........................343/6.5 SS |

*Primary Examiner*—Malcolm F. Hubler
*Attorney*—George B. Oujevolk

[57] ABSTRACT

An object identification system comprising a frequency sweep generator which generates an interrogation signal to be transmitted by the transmitter; a response device, consisting of passive resonance elements, mounted on the object to be identified; a receiver for receiving the reply signals; a phase shifter connected to the output of the frequency sweep generator; phase detector which compares the output of the receiver with the phase shifter output; and the series connection of a low pass filter, amplifier, and Schmitt circuit connected to the output of the phase detector in order to detect the steep phase variation of the signal received from the object.

6 Claims, 17 Drawing Figures

PRIOR ART

RESPONSE SIGNALS →
TIMING PULSE

PRIOR ART

FIG. 7
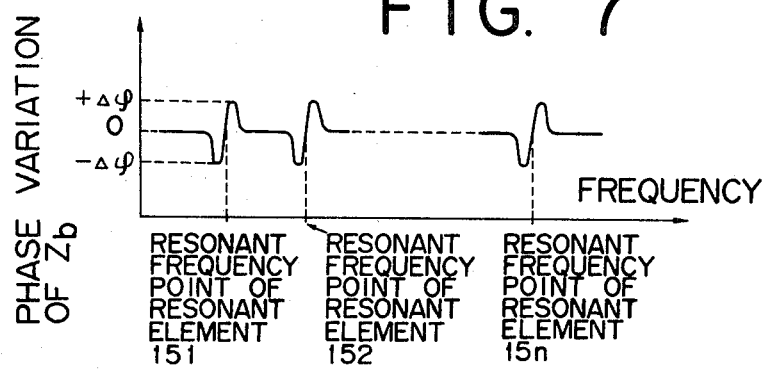
FIG. 8
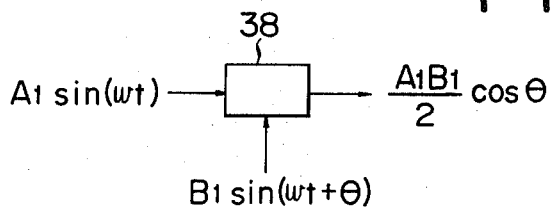
FIG. 9
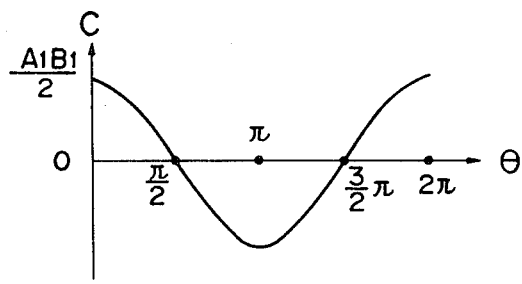
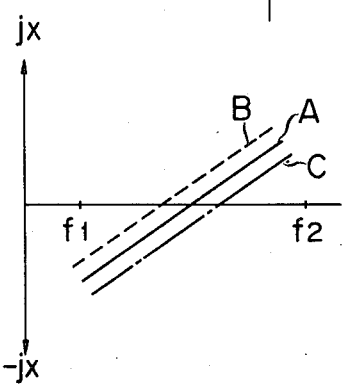
FIG. 15

OBJECT IDENTIFICATION SYSTEM

This is a continuation of application Ser. No. 794,854, filed Jan. 29, 1969, now abandoned.

This invention relates to improvements of an object identification system for identifying individual objects such as freight cars or other vehicles by detecting codes predetermined for respective objects according to their types, numbers or the like.

In order to identify codes inherent to types, numbers or the like of objects, an object identification system has been proposed wherein a response device including a loop coil connected to a suitable combination of resonance elements having different resonance frequencies corresponding to said inherent codes is mounted on each object, a frequency-sweep wave having frequencies distributed in a predetermined frequency range is emitted toward the response device from an object identification device located near the passage of said objects, and the relationship among the times of arrival of response signals from the response device is investigated to determine the resonance frequency of a particular resonance element incorporated in the response device of a particular object by the frequency of response signal at an instant at which the response signal presents itself, so as to identify the object. As resonance elements for this purpose, it has been noted that ceramic resonance elements are suitable and a response device connected to a plurality of elements includes a loop coil adapted to transmit a response signal having a plurality of resonance points determined by the resonance elements. For the sake of description, the response device of such an object identifying system is assumed to be comprised by a number of combinations of some of five resonance elements having resonance frequencies $f_1$, $f_2$, $f_3$, $f_4$ and $f_5$, respectively.

Thus, for example, as shown in FIG. 1, it is now assumed that resonance elements 11 and 12 having resonance frequencies $f_2$ and $f_4$, respectively, are incorporated into the response device of an object and that these resonance elements are connected to a loop coil 13 via a condenser 14 to form a response device 15. As shown in FIG. 2a, a frequency-sweep signal, serving as an interrogation signal within a frequency range of $f_1$ to $f_5$ is transmitted toward response device 15 through a transmitting and receiving coil 17 from an object identification device 16 located close to the passage of the objects. When utilizing an interrogation signal having a form as shown in FIG. 2a, at instants when the frequency of the interrogation signal becomes equal to $f_2$ and $f_4$, the resonance elements in the response device 15 resonates to produce response signals. Further, in the object identification device of the type referred to above, in order to determine at which instant said response signal is produced, a timing pulse as shown in FIG. 2 c is provided to determine the instant the response is generated and the timing pulse is coincides with the response signal pulse. While a number of methods may be used to generate the timing pulse, in one example, the timing pulse is formed by passing a portion of the interrogation signal transmitted toward the response device through five resonance elements 18, 19, 20, 21 and 22 having resonance frequencies $f_1$ to $f_5$, inclusive, and then detecting and shaping the signal by means of a detector circuit 23 and a shaping circuit 24 as shown in FIG. 3. To read the response signal received by the object identification device 16, the response signal is shifted by the timing pulse and entered into a predetermined position of a register 25, as shown in FIG. 4 to be treated to determine the frequency of the response signal received by the object identifation device, thus identifying the object according to the particular combination of frequencies.

The following two systems have been proposed to detect the response signal utilized in the object identification system described above. More particularly, according to one system an interrogation signal which varies its frequency with time is transmitted to the response device from the object identification device and the response signal from the response device is detected by utilizing the amplitude resonance characteristics of the resonance elements in the response device. Since such a detecting system utilizes the amplitude resonance characteristics of the resonance elements in the response device, in order to precisely identify resonance frequencies of the resonance elements it is not possible to too closely set respective resonance frequencies, which means that it is impossible to decrease the spacing between resonance frequencies of the response device. In other words, as the amplitude resonance characteristics of the resonance elements are not sufficiently sharp too close a spacing between resonance frequencies results in overlapping of the characteristics. For this reason, at present it is not possible to decrease the spacing below 10 KC, thus decreasing the number of resonance elements accomodatable in a given frequency band. This means that it is necessary to use a wider frequency band to identify a given number of objects. Conversely, where the frequency band is limited, the number of objects that can be identified is decreased.

According to the other identification system the second derivative of the amplitude resonance characteristics of the resonance elements is utilized as the response signal. Said second derivative is derived from the secondary distortion (a wave having twice the frequencies as those of the modulating wave) of the response signals coming back from the response device when a frequency modulated sweep wave is transmitted thereto to act as the interrogation signal. Due to the characteristics of the resonance elements it has been determined that the modulating frequency of about 1 KC is suitable. With such an object identification system, it is necessary to increase the frequency-sweep speed to increase the speed of identification but it is impossible to increase the frequency-sweep speed beyond a certain limit in view of the modulating frequency. At present, a frequency-sweep speed of more than about 6,000 KC/s does not result in any effective response signal so that it is impossible to increase the speed of identification.

An object of this invention is to provide an improved object identification system capable of identifying much more objects at higher speed.

Another object of this invention is to provide an object identification system which is more convenient to use, and in which a response loop coil and resonance elements are located at different points.

In accordance with this invention there is provided an object identification system comprising a frequency-sweep means to generate an interrogation signal adapted to sweep a predetermined frequency range, means to transmit the interrogation signal generated by said frequency sweeping means to a response device mounted on an object and including resonance elements having predetermined oscillation frequencies and to receive the response signal from said response device, and means to detect a steep phase variation of the signal received by said receiving means occurring at respective resonance frequency points of said resonance elements of said response device.

The invention can be more fully understood from the following detailed description taken in conjunction with the accompanying drawings, in which.

Figure 6:
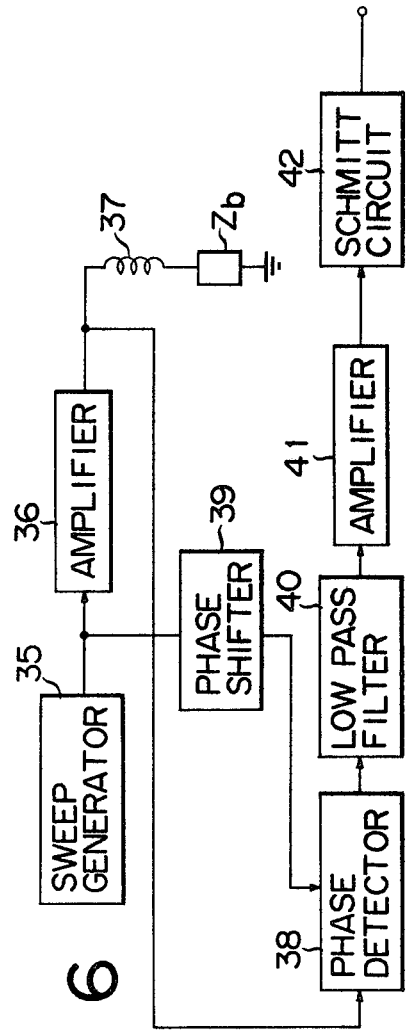
FIG. 6 shows an equivalent circuit of the identification system shown in FIG. 5.
Figure 10:
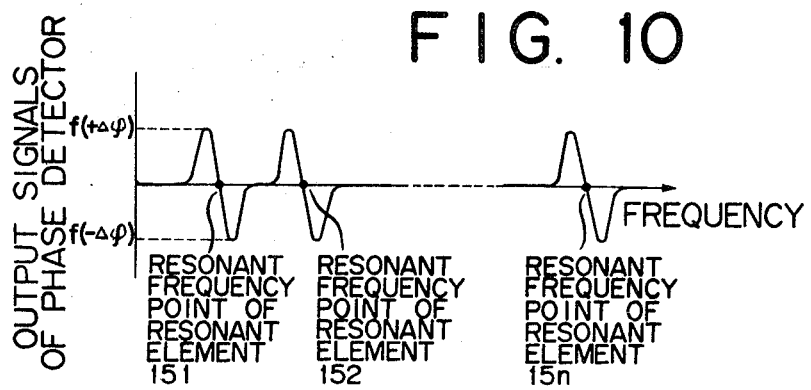
Figure 11:
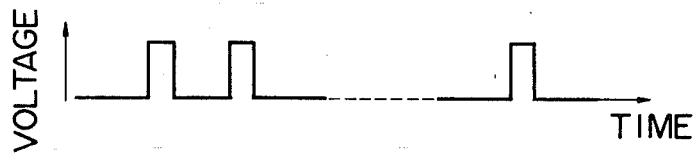
Figure 13:
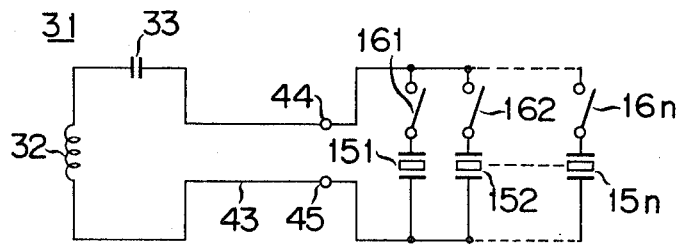
Figure 14:
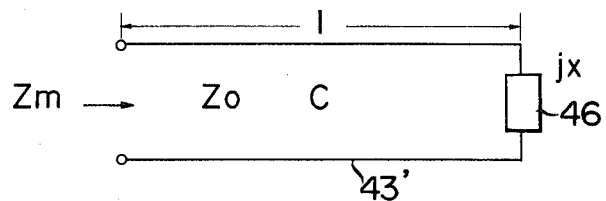
Figure 12:
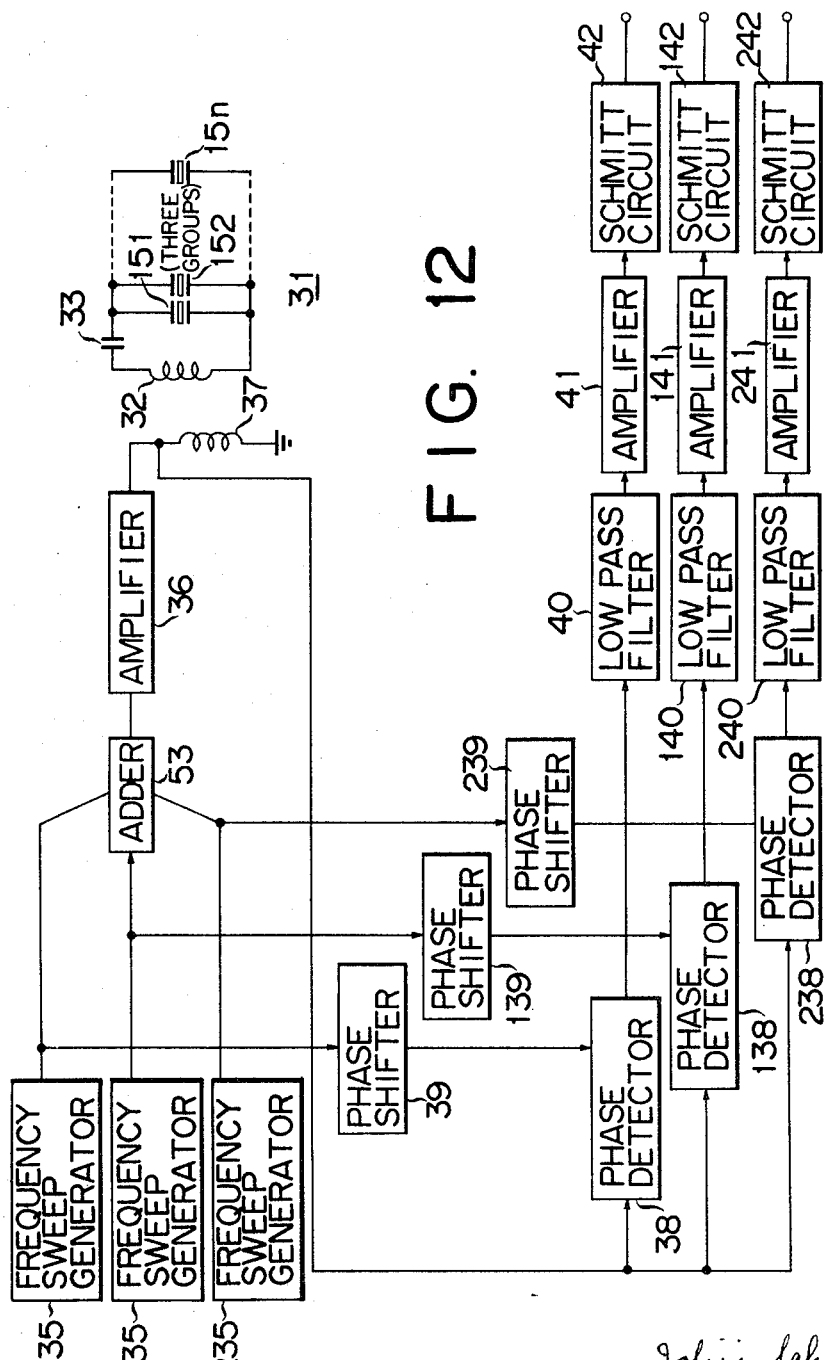

FIGS. 7 to 11 are graphs to explain the operation of the equivalent circuit shown in FIG. 6 wherein FIG. 7 shows phase characteristics, FIG. 8 shows a diagram to explain the construction of a phase detector, FIG. 9 shows a waveform of an output signal from the phase detector, FIG. 10 shows a waveform of an output signal from the phase detector shown in FIG. 6 and FIG. 11 shows the output waveform from the wave shaping circuit shown in FIG. 6;

FIG. 12 is a block diagram of a modified embodiment;

FIG. 13 shows still another modification;

FIG. 14 shows a diagram to explain a coaxial cable utilized in the modification shown in FIG. 13; and FIG. 15 is a graph to explain the operation of the modification shown in FIG. 13.

Figure 1:
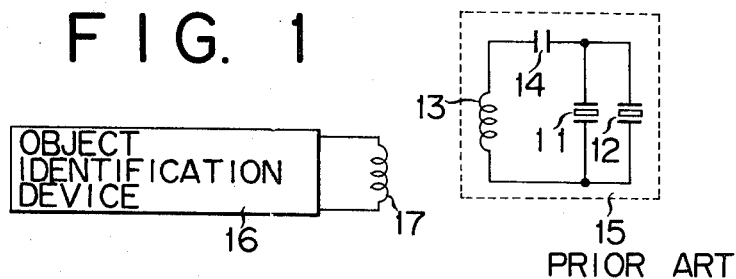
FIG. 1 shows a diagram of a prior art object identification system.
Figure 2A:
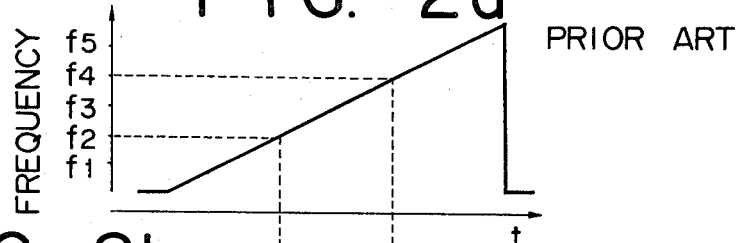
FIGS. 2a, 2b and 2c are signal waveforms to explain the operation of the identification system shown in FIG. 1.
Figure 2B:
Figure 2C:
Figure 3:
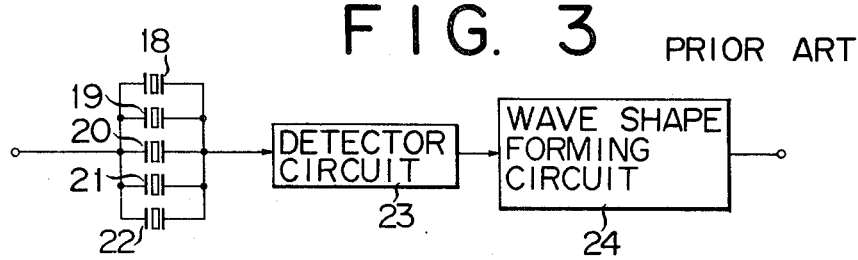
FIGS. 3 and 4 are partial views of certain essential elements of the identification system shown in FIG. 1.
Figure 4:
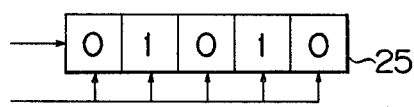
Figure 5:
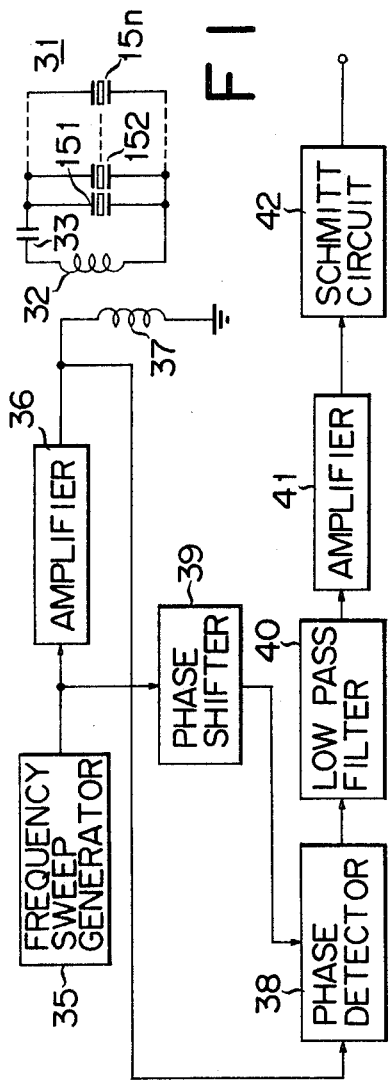
FIG. 5 is a block diagram of one embodiment of this invention.

As shown in FIG. 5, a response device 31 adapted to be mounted on an object moving in a predetermined direction such as a vehicle comprises a plurality of resonance elements 151, 152 ... 15n having different resonance frequencies and connected in parallel to the series connection of a loop coil 32 and a condenser 33. It is to be understood that the number of these resonance elements 151, 152 ... 15n and the combination of resonance frequencies are dependent upon codes inherent to the object such as the type, number and the like thereof. In order to identify the code of the object there is provided an object identification device including a sweep generator 35 adapted to transmit to the object an interrogation signal that sweeps over a frequency range sufficient to cover the resonance frequency range of resonance elements 151, 152 ... 15n utilized in the response device 31. The sweep wave is sufficiently amplified by an amplifier 36 and is then supplied to a transmitting and receiving loop coil 37. The amplifier 36 is of the type having a high impedance and provides large output signal. The transmitting and receiving loop coil 37 is coupled electromagnetically with the loop coil 32 of the response device 31. Suppose that these coils are electromagnetically coupled together at a coupling coefficient of $k$ when an object passes by a predetermined point, the impedance $Z$ of the response device 31 as viewed from one terminal of the transmitting and receiving loop coil 37 is expressed as follows:

$$Z = j\omega L_1 + \frac{\omega^2 k^2 L_1 L_2}{j\left(\omega L_2 - \frac{1}{\omega C}\right) + Z_a} \quad 1$$

where $L_1$ represents the inductance of transmitting and receiving loop coil 37, $L_2$ that of loop coil 32 of response device 31, $C$ the capacitance of condenser 33, and $Z_a$ the resultant of impedances $Z_1, Z_2 \ldots Z_n$ of parallel connected resonance elements 151, 152 ... 15n and is expressed as follows:

$$Z_a = 1/(1/Z_1) + (1/Z_2) + \ldots (1/Z_n) \quad 2$$

In equation 1, the second term represents the response component $Z_b$ of the response device which is expressed as follows:

$$Z_b = \frac{\omega^2 k^2 L_1 L_2}{J\left(\omega L_2 - \frac{1}{\omega C}\right) + Z_a} \quad 3$$

By substituting $Z_b$ for the response component of the response device the circuit shown in FIG. 5 can be represented by an equivalent circuit shown in FIG. 6 in which use is made of the fact that the phase characteristics of response component $Z_b$ of the response device 31 varied sharply near the resonance frequency points of resonance elements 151, 152 ... 15n as shown in FIG. 7. Thus the voltage $Es$ across transmitting and receiving loop coil 37 in response to the response signal from the response device 31 can be expressed by an equation $$Es = IZ \quad 4$$

where $I$ represents the current flowing through transmitting and receiving coil 37. Since amplifier 36 is comprised by a high output impedance amplifier, it may be considered as a constant current source. Accordingly, voltage $Es$ is proportional to impedance $Z$ expressed by equation 1 and the phase variation of voltage $Es$ equals to that of impedance $Z$ which in turn is nearly equal to the phase variation of response component $Z_b$. As a consequence, the phase variation $\pm \Delta \phi$ of voltage $Es$ across terminals of transmitting and receiving loop coil becomes substantially equal to that of response component $Z_b$ shown in FIG. 7, thus manifesting sharp changes near the resonance frequency points of the resonance elements. If it is assumed now that, as shown in FIG. 8, input signal A to a phase detector 38 is represented by $A_1 \sin(\omega t)$ and that the reference signal B by $B_1 \sin(\omega t + \theta)$, then it is well known that the output signal C from the phase detector can be shown by $$C = (A_1 B_1 / 2) \cos\theta \quad 5$$

The output signal varies in a manner as shown in FIG. 9. Accordingly, simultaneously with the application of a sweep signal to phase detector circuit 38 as the reference signal from sweep generator 35 through a phase shifting circuit, a response signal transmitted from response device 31 and received by the transmitting and receiving loop coil 37 is applied to the phase detector circuit as an input signal. By varying the degree of phase shift provided by phase shifting circuit 39, the output signal from phase shifting circuit can be varied. When phase shifter 39 is adjusted such that the phase difference between the input signal to phase detector 38 and the reference signal equals to $\pi/2$ when the response device 31 is not electromagnetically coupled with transmitting and receiving loop coil 37, an output signal as shown in FIG. 10 will be obtained by varying the phase of the input signal to phase detector circuit 38 in a manner as shown in FIG. 7 under a condition wherein response device 31 and transmitting and receiving loop coil 37 are electromagnetically coupled. The amplitude of the output signal of the phase detector is represented as a function of the phase variation. Even when the phase difference between the input signal to the phase detector circuit 38 and the reference signal is not equal to $\pi/2$, it will be clear that an advantageous detected waveform can be produced by the phase detector circuit because the phase of its input signal varies in the manner as shown in FIG. 7. The resulted output signal from phase detector circuit 38 is passed through a low pass filter 40. The output signal from the low pass filter 40 is amplified by an amplifier 41. The amplified signal is shaped into a pulse shown in FIG. 11 by means of a wave forming circuit such as a Schmitt circuit 42 and is finally supplied to an indicator, not shown, to identify the object.

In the detecting circuit described above since steep phase resonance characteristics of resonance elements included in the response device are utilized as means for detecting the response signal from the response device, even when the spacing between resonance frequencies of the resonance elements included in the response device is reduced to less than one half of the spacing of the prior device it is possible to clearly separate and detect the response signal as shown in FIG. 11, and owing to the property of the phase characteristics of resonance elements, even when the frequency-sweep speed is three times as fast as the prior frequency-sweep speed, it is possible to clearly separate and detect the response signal as shown in FIG. 11. No active elements are necessary for response device.

FIG. 12 illustrates a modified embodiment of this invention according to which objects can be identified more quickly. More particularly, n resonance elements included in the response device 31 of the previous embodiment for the purpose of representing the type, number or the like of the objects are divided into three groups, for example. Sweep generators 35, 135 and 235 are provided to generate interrogation signals having different frequency ranges corresponding to respective groups. Frequency sweep signal generated by these sweep oscillators are combined by an adder 53 and the output from the adder is supplied to an amplifier 36 to produce output signals from transmitting and receiving loop coil 37 in three channels, thus investigating resonance elements in each group by the interrogation signal in each channel. The response signal across terminals to transmitting and receiving coil 37 is supplied to phase detectors 38, 138 and 238 in respective channels. At the same time, sweep signals from corresponding sweep generators 35, 135 and 235 are applied to phase detectors 38, 138 and 238 as the reference signals respectively through phase shifting circuits 39, 139 and 239 to effect phase detection. Outputs from phase detectors 38, 138 and 238 are successively passed through low pass filters 40, 140 and 240, amplifiers 41, 141 and 241 and shaping circuits 42, 142 and 242 to obtain detecting pulses. Where $\gamma$ multiplex channels are employed, the number of objects that can be identified in the same interval can be increased by a factor of $\gamma$ when compared with the previous embodiment whereas the required time for identification can be reduced to $1/\gamma$ if the number of the objects were the same.

FIGS. 13 to 15 illustrate yet another embodiment of this invention wherein response loop coil 32 of response device 31 is connected to resonance elements through a line 43 of distributed constant. More particularly, the circuit comprising response loop coil 32 and a condenser 33 is connected to terminals 44 and 45 through a transmission line 43 having an electrically stable distribution constant such as a coaxial cable and the like and terminals 44 and 45 are connected in parallel with a plurality of resonance elements 151, 152 . . . 15n tuned to resonance frequencies inherent to respective objects. Switching elements 161, 162 . . . 16n are connected in series with resonance elements 151, 152 . . . 15n, respectively.

Where a coacial cable is used as the transmission line 43, and when an inductance load 46 is connected to the coaxial cable 43' as shown in FIG. 14, the impedance $Zin(\Omega)$ is given by the well known equation $$Zin(\Omega) = j \cdot \frac{1 + \frac{\omega C}{X} l Z_0^2}{1 - \omega C l x} \ (\Omega) \qquad 6$$

where $l$ represents the length of the coaxial cable in meters, $Z_0(\Omega)$ the characteristic impedance of the coaxial cable 43', $X(\Omega)$ the reactance connected to the coaxial cable and $C$ the capacitance (farad per meter) of the coaxial cable.

If the reactance-frequency characteristics of the assembly of loop coil 32 and condenser 33 involved in the object indentification system of FIG. 13 are represented by the solid line A of FIG. 15 within the range of the used frequency, then the overall reactance of the circuit of loop coil 32 and condenser 33 and the transmission line 43 as viewed from the output terminals 44 and 45 of the transmission line 43 will increase by that extent which is equal to that of the transmission line 43 as shown by the dotted line B of FIG. 15. While the characteristics denoted by the dotted line B are somewhat different from those of the solid line A, the difference may be amended by previously displacing the reactance of the circuit of loop coil 32 and condenser 33 as shown by the dot-dash line C of FIG. 15. In a transmission line, such as a coaxial cable, which can be treated as a line having electrically stable distribution constants it is very easy to set its circuit constants according to the above described equation and in addition it is possible to maintain its electrical characteristics in good conditions against parasitic oscillations, mechanical vibrations or heat.

Thus, in accordance with this modified embodiment it is possible to locate at different positions loop coil 32 and groups of resonance elements 151, 152 . . . 15n without impairing electrical characteristics of the object identification system.

As above described this invention provides an object identification system capable of detecting much more number of objects at higher speed than prior object identification system and wherein the response loop coil and resonance elements can be installed at different positions.

What we claim is:

1. An object identification system comprising frequency-sweep means to generate an interrogation signal to sweep a predetermined frequency range, a transmitting and receiving means to transmit the interrogation signal toward a response device mounted on an object to be identified and to receive a response signal from said response device, said response device consisting of a plurality of passive resonance elements and means to detect steep phase variation of said response signal with the phase of the interrogation signal as a reference, said steep phase variation being produced due to the frequency-phase characteristics of said resonance elements when the interrogation signal sweeps successively each resonance point of a plurality of said resonance elements.

2. An object identification system comprising a frequency sweep generator which generates an interrogation signal to be transmitted by a transmitter; a response device, consisting of passive resonance elements, mounted on an object to be identified; a receiver for receiving a response signal from said response device; a phase shifter connected to the output of the frequency sweep generator; phase detector which compares the output of the receiver with the output of said phase shifter; and the series connection of a low pass filter, an amplifier, and a wave shaping circuit connected to the output of the phase detector in order to detect the steep phase variation of the signal received from the object.

3. In an object identification system having frequency-sweep means to generate an interrogation signal to sweep a predetermined frequency range, a transmitting and receiving means to transmit the interrogation signal toward a response device mounted on an object to be identified and to receive a response signal from said response device, said response device including a plurality of resonance elements respectively having predetermined resonance frequencies, and means to detect steep phase variation of the received signal occurring at respective resonance frequency points of said resonance device, the improvement wherein said frequency sweep means comprises a sweep generator, said transmitting and receiving means comprises a high output impedance amplifier adapted to amplify the output of said sweep generator, a transmitting and receiving coil to transmit the output of said amplifier toward said response device mounted on the object, said response device includes a loop coil, a condenser connected to said loop coil and a plurality of resonance elements connected in parallel to the series connection of said loop coil and condenser, each of said resonance elements having a different resonance frequency, said loop coil being arranged to transmit to said transmitting and receiving coil a signal including steep phase variation occurring at frequencies corresponding to resonance frequencies of said resonance elements, and wherein said means to detect phase variation comprises a phase shifter to which the output from said sweep generator is supplied, a phase detector to which the output from said phase shifter as a reference signal is supplied and a signal received by said transmitting and receiving coil and containing said variation are supplied, a low pass filter to which the output signal from said phase detector is supplied, a low pass filter to which the output signal from said phase detector is supplied, and a wave shaping circuit to amplify and shape the output signal from said low pass filter thereby to identify said object.

4. An object identification system according to claim 3, wherein said response device comprises a circuit including a loop coil and a condenser, a circuit including resonance elements and lines having distributed constants and adapted to interconnect said circuits so that said loop coil and said resonance elements may be located at different positions of said object.

5. In an object identification system having frequency-sweep means to generate an interrogation signal to sweep a predetermined frequency range, a transmitting and receiving means to transmit the interrogation signal toward a response device mounted on an object to be identified and to receive a response signal from said response device, said response device including a plurality of resonance elements respectively having predetermined resonance frequencies, and means to detect respective resonance frequency points of said resonance elements of said response device, the improvement wherein said frequency sweep means comprises a plurality of sweep oscillators; and transmitting and receiving means comprises an adder to combine the outputs from said sweep oscillators, a high output impedance amplifier to amplify the output from said adder, and a transmitting and receiving coil to transmit the output to said response device, said response device including a loop coil, a condenser connected in series with said loop coil, and a plurality of resonance elements having different resonance frequencies and respectively connected in parallel to the series connection of said loop coil and condenser, said resonance elements being divided into a plurality of groups of the number equal to that of sweep oscillators with respect to their resonance frequency ranges, and the resonance frequencies of said resonance elements belonging to respective groups being included in the range of sweep frequency of corresponding sweep oscillators, said transmitting and receiving coil being arranged to receive a signal containing steep phase variation occurring at frequencies corresponding to resonance frequency points of said resonance elements; and said steep phase variation detecting means comprises a plurality of phase shifters connected to receive output signals from said sweep oscillators, a plurality of phase detectors connected to receive outputs from said phase shifters as the reference signals and to receive said signal received by said transmitting and receiving coil and containing said variation as the input signal, a plurality of low pass filters connected to receive output signals from said phase detectors, and a plurality of wave shaping circuits to shape the output signals from said low pass filters, thereby to identify said object.

6. An object identification system according to claim 5, wherein said response device comprises a circuit including a loop coil and a condenser, a circuit including a plurality of resonance elements and line having distributed constants and adapted to interconnect said circuits so that said loop coil and said resonance elements may be located at different positions of said object.

* * * * *